(12) United States Patent
Ichikawa et al.

(10) Patent No.: US 10,014,510 B2
(45) Date of Patent: Jul. 3, 2018

(54) BUSBAR MODULE AND BATTERY PACK

(71) Applicant: YAZAKI CORPORATION, Tokyo (JP)

(72) Inventors: Yoshiaki Ichikawa, Shizuoka (JP); Hirotaka Mukasa, Shizuoka (JP); Hirokuni Koike, Shizuoka (JP)

(73) Assignee: YAZAKI CORPORATION, Minato-ku, Tokyo (JP)

( * ) Notice: Subject to any disclaimer, the term of this patent is extended or adjusted under 35 U.S.C. 154(b) by 0 days.

(21) Appl. No.: 15/163,227

(22) Filed: May 24, 2016

(65) Prior Publication Data
US 2016/0268578 A1 Sep. 15, 2016

Related U.S. Application Data

(63) Continuation of application No. PCT/JP2014/084391, filed on Dec. 25, 2014.

(30) Foreign Application Priority Data

Dec. 25, 2013 (JP) .................................. 2013-267769

(51) Int. Cl.
*H01M 2/20* (2006.01)

(52) U.S. Cl.
CPC ........ *H01M 2/206* (2013.01); *H01M 2220/20* (2013.01)

(58) Field of Classification Search
CPC .......................... H01M 2220/20; H01M 2/206
See application file for complete search history.

(56) References Cited

U.S. PATENT DOCUMENTS

2012/0328920 A1 12/2012 Takase et al.
2013/0234511 A1* 9/2013 Murata ............... H01M 2/1077
307/10.1

FOREIGN PATENT DOCUMENTS

| JP | 2011-210710 A | 10/2011 |
| JP | 2012-109196 A | 6/2012 |
| JP | 2012-226969 A | 11/2012 |

OTHER PUBLICATIONS

International Search Report for PCT/JP2014/084391 dated Mar. 17, 2015 [PCT/ISA/210].
Written Opinion for PCT/JP2014/084391 dated Mar. 17, 2015 [PCT/ISA/237].
Communication dated Mar. 14, 2017 from the Japanese Patent Office in counterpart Application No. 2015-555021.
Communication dated May 23, 2017 from the Japanese Patent Office in counterpart Application No. 2015-555021.

* cited by examiner

*Primary Examiner* — Sarah A Slifka
*Assistant Examiner* — Lilia Nedialkova
(74) *Attorney, Agent, or Firm* — Sughrue Mion, PLLC (57) ABSTRACT

Provided is a busbar module including a plurality of split busbar modules that are configured such that a busbar group including a plurality of busbars and split flat cable including a plurality of linear conductors are integrated at one end side in a longitudinal direction of the split flat cables. The plurality of split busbar modules include split flat cables having a length different from each other and are configured such that the split flat cables are overlapped with each other and the busbar groups are respectively arranged in the same direction.

17 Claims, 9 Drawing Sheets

BUSBAR MODULE AND BATTERY PACK

CROSS-REFERENCE TO RELATED APPLICATION

This application is a continuation application of International Application PCT/JP2014/084391, filed on Dec. 25, 2014, and designating the U.S., the entire contents of which are incorporated herein by reference.

BACKGROUND OF THE INVENTION

1. Field of the Invention

The present invention relates to a busbar module and a battery pack.

2. Description of the Related Art

<Battery Module for Use in Electric Vehicles or Hybrid Vehicles>

In order to increase the output of a battery module for use in electric vehicles or hybrid vehicles, battery cells are disposed in a state of being overlapped with each other such that electrode terminals on one side of the battery cells are arranged in a row and electrode terminals on the other side thereof are arranged in a row. Then, the battery module is configured in such a manner that the electrode terminals of the adjacent battery cells are connected to each other by busbars and thus a large number of battery cells are connected to each other in series or in parallel.

<Drawbacks of the Battery Module in which a Large Number of Battery Cells are Arranged>

However, assembly tolerances are set between the plurality of battery cells that are overlapped with each other. For this reason, in the battery module in which a number of battery cells are arranged, there is a case where pitches between the electrode terminals formed in the adjacent battery cells are shifted by accumulation of the tolerances. In the battery module, furthermore, a temperature rises during use of the battery cells to cause expansion or shrinkage of the battery cells in an arrangement direction, and thus the pitches between the electrode terminals may be shifted. When the pitches between the electrode terminals were larger shifted, there was a concern that a positional shift could not be absorbed in a conventional integrally-molded connection plate. In the following description, it is referred to as a tolerance including the tolerance and errors caused by the temperature rising.

<Battery Module Capable of Adjusting the Pitch Shift>

A battery module for eliminating such a pitch shift is disclosed in which the shift of pitches between adjacent electrode terminals can be easily adjusted (see Japanese Patent Application Laid-open No. 2011-210710). In the battery module disclosed in Japanese Patent Application Laid-open No. 2011-210710, portions of a flat cable to be disposed between adjacent busbars are provided with folded portions formed by folding the flat cable at folded wires intersecting with a longitudinal direction of the flat cable, and the pitches are allowed to absorb in the folded portions.

The battery cells are used much more to largely increase the output of the battery pack, and thus the number of voltage detecting wires also more increases. In that case, according to the battery module disclosed in Japanese Patent Application Laid-open No. 2011-210710, the breadth (direction perpendicular to the longitudinal direction) of the flat cable becomes longer, and thus the dimension of the battery pack increases, resulting in being contrary to the needs of the times which aims for downsizing.

SUMMARY OF THE INVENTION

It is an object of the present invention to provide a busbar module that can absorb the tolerance of pitches between electrode terminals without the need to increase the dimension of a battery pack even when the number of battery cells increases. In addition, it is another object of the present invention to provide a battery pack that uses such a busbar module, whereby an increase in size is suppressed.

In order to achieve the above mentioned object, a busbar module according to one aspect of the present invention includes a plurality of split busbar modules in which busbars and linear conductors are electrically connected to each other one by one, and which are configured such that a busbar group including the plurality of busbars and split flat cables including the plurality of linear conductors are integrated at one end side in a longitudinal direction of the split flat cables. Herein, the busbar group is an electrode terminal provided to at least two battery cells of a plurality of battery cells overlapped with each other in a same direction, and is configured such that the plurality of busbars are arranged in parallel at predetermined intervals in the same direction to electrically connect the electrode terminals arranged in the same direction to each other, the at least two battery cells being continuous to each other in the same direction. The split flat cable includes the plurality of linear conductors which are arranged in parallel at predetermined intervals along a row direction of the plurality of busbars and a resin portion configured to cover the plurality of linear conductors. The plurality of split busbar modules include split flat cables having a length different from each other and are configured such that the split flat cables are overlapped with each other and the busbar groups are respectively arranged in the same direction.

According to another aspect of the present invention, the plurality of split busbar modules are configured such that the split flat cables are overlapped with each other in descending order of a length or in ascending order of the length.

According to still another aspect of the present invention, the split busbar module is configured such that the busbar group and the split flat cable are connected to each other by the resin portion.

According to still another aspect of the present invention, edges of the busbars in the busbar group are connected to each other by another resin portion, the edges being opposite to the split flat cable.

Further, in order to achieve the above mentioned object, a battery pack according to still another aspect of the present invention includes the busbar described above; and a battery module having the plurality of battery cells overlapped with each other in a same direction.

The above and other objects, features, advantages and technical and industrial significance of this invention will be better understood by reading the following detailed description of presently preferred embodiments of the invention, when considered in connection with the accompanying drawings.

DETAILED DESCRIPTION OF THE PREFERRED EMBODIMENTS

A busbar module according to the present invention is formed by a combination of a plurality of split busbar modules. The split busbar module is a module in which busbars and linear conductors are electrically connected to each other one by one, and is configured such that a busbar group including the plurality of busbars and a split flat cable including the plurality of linear conductors are integrated at one end side in a longitudinal direction of the split flat cable. Here, the busbar group is an electrode terminal formed in at least two battery cells of a plurality of battery cells overlapped with each other in a same direction, and is configured such that the plurality of busbars are arranged in parallel at predetermined intervals in the same direction to electrically connect the electrode terminals arranged in the same direction to each other, the at least two battery cells being continuous to each other in the same direction. In addition, the split flat cable includes the plurality of linear conductors that are disposed in parallel at predetermined intervals along a row direction of the plurality of busbars and a resin portion that covers the plurality of linear conductors. The plurality of split busbar modules include split flat cables having a length different from each other and are configured such that the split flat cables are overlapped with each other and the busbar groups are respectively arranged in the direction described above. For example, the plurality of split busbar modules are configured such that the split flat cables are overlapped with each other in descending order of the length or in ascending order of the length. The busbar module is configured in this way. Here, in the split busbar module, the busbar group and the split flat cable are connected to each other by the resin portion. In addition, edges of the busbars in the busbar group are connected to each other by another resin portion, the edges being opposite to the split flat cable. A battery pack according to the present invention includes such a busbar module and a battery module having the plurality of battery cells overlapped with each other in a same direction. A busbar module and a battery pack according to an embodiment of the present invention will be described below in detail with reference to the accompanying drawings. The present invention is not limited to this embodiment.

<Battery Pack 10 According to the Present Embodiment>

Figure 1:
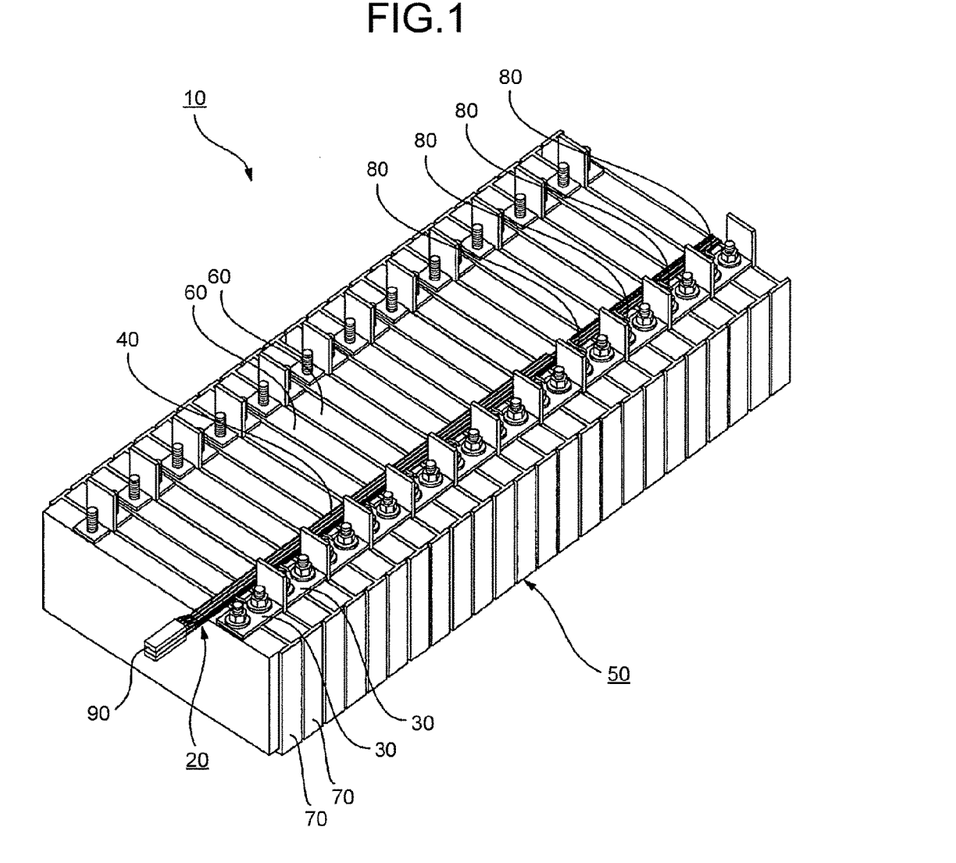
FIG. 1 is a perspective view of a battery pack including a busbar module and a battery module according to the present invention.
Figure 2:
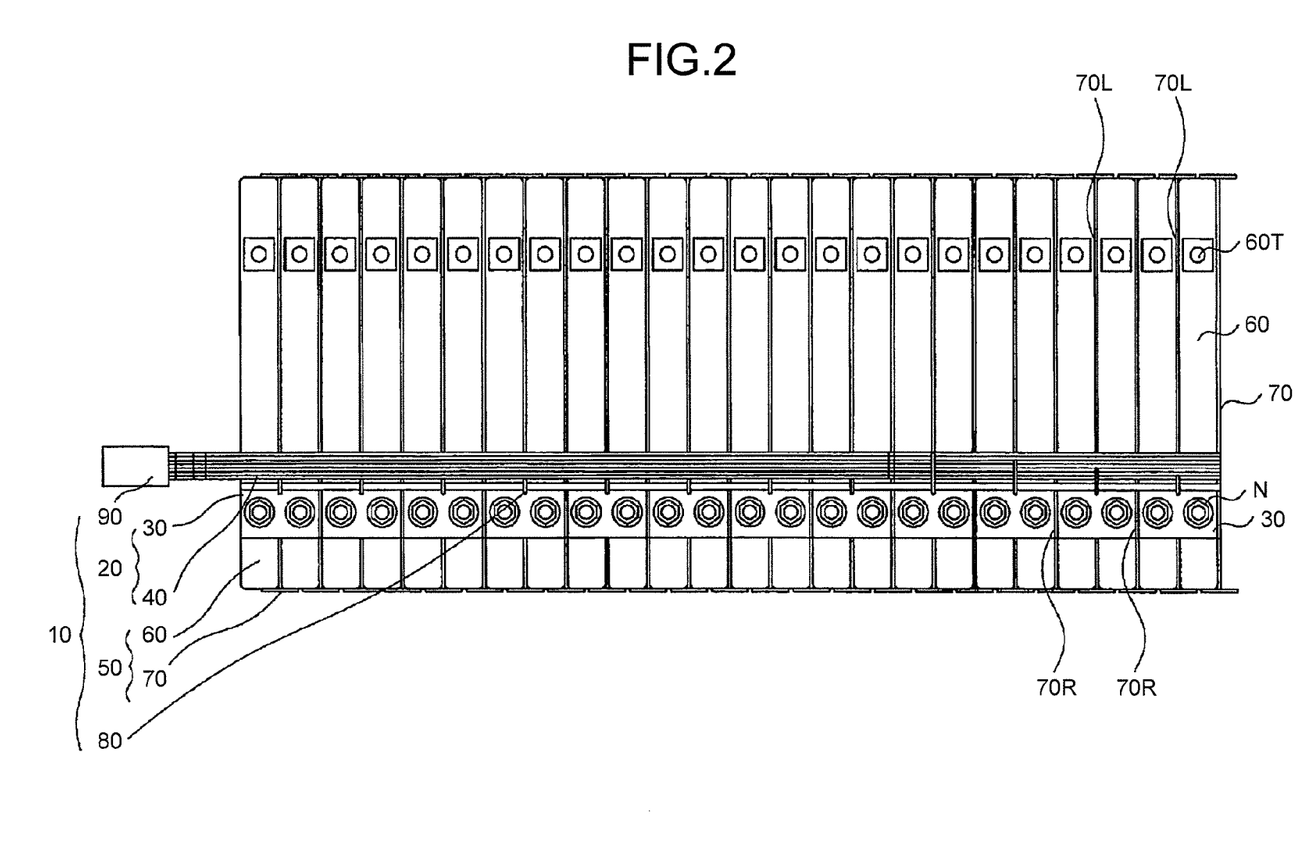
FIG. 2 is a plane view of the battery pack illustrated in FIG. 1.

In FIGS. 1 and 2, a battery pack 10 according to the present invention is configured to include busbar modules 20, battery modules 50, connection portions 80, and connectors 90. The busbar module 20 includes a plurality of busbars 30 that are configured to connect a plurality of battery cells 60 to each other in series and a flat cable 40 that is configured to detect a voltage of each of the busbars 30 and transmit the detected voltage to a voltage detecting portion. The flat cable 40 is configured to include a plurality of linear conductors that are arranged in a planar shape and covered with a resin portion to detect the voltage of each of the busbars 30, thereby transmitting the detected voltage to the voltage detecting portion. The battery module 50 is configured to include the plurality of battery cells 60 and separators 70 that partitions the battery cells 60 into each other. The connection portion 80 is configured to electrically connect a predetermined busbar 30 and a predetermined linear conductor to each other. The connector 90 is configured to be fitted into an external mating connector in a state where a plurality of linear conductors are collected. These components will be described below in detail.

<Busbar Module 200>

Figure 3A:
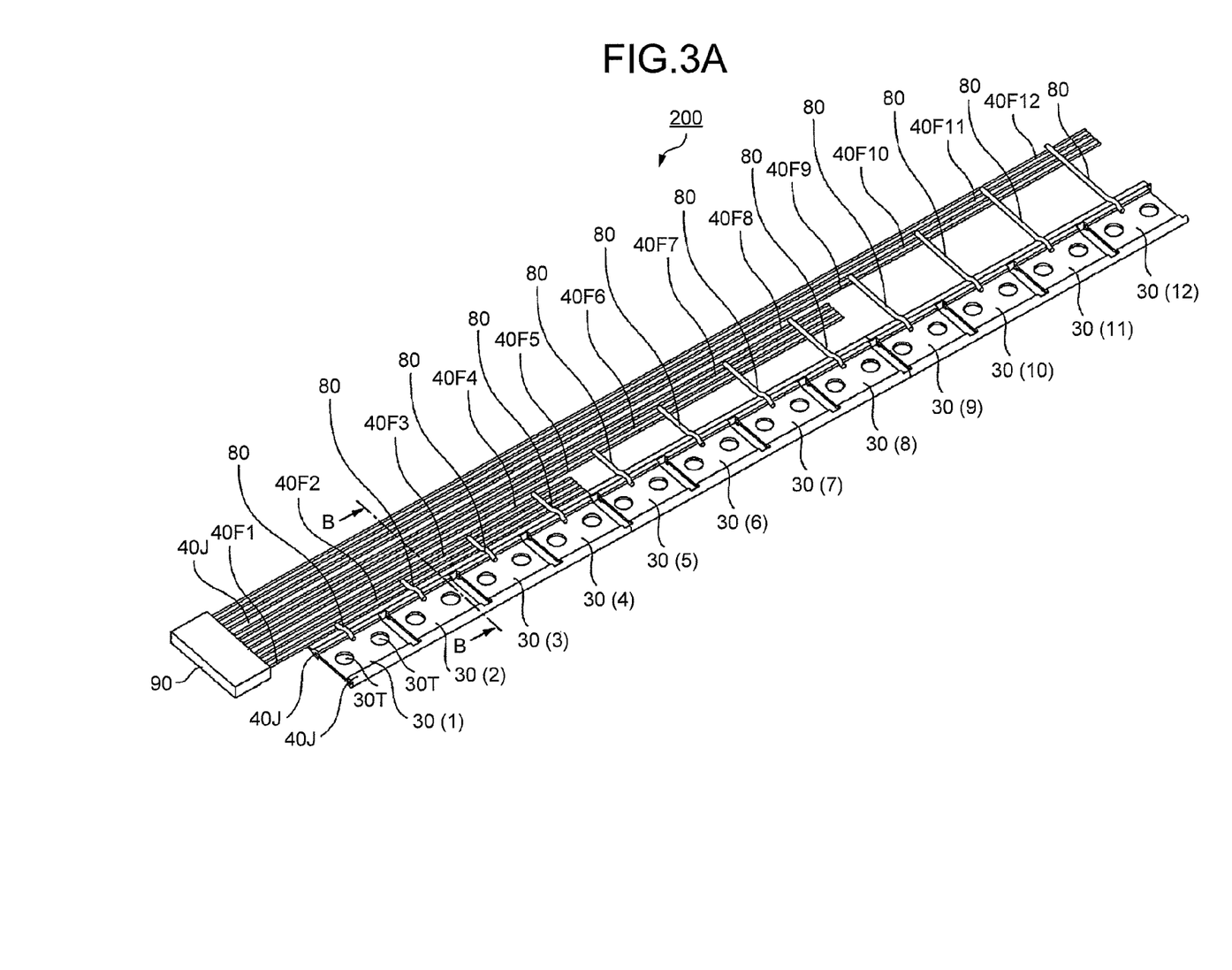
FIG. 3A is a perspective view of a busbar module which is a preceding invention of the busbar module according to the present invention.
Figure 3B:
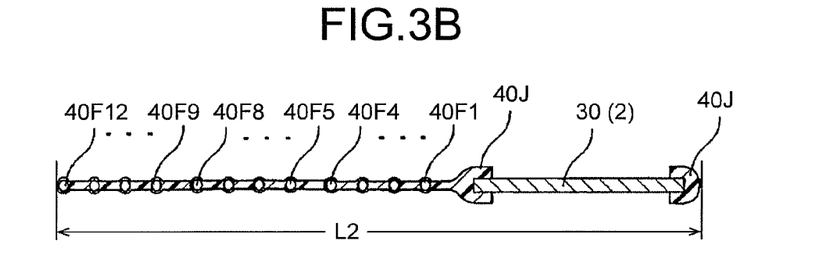
FIG. 3B is a cross-sectional view taken along the line B-B indicated by the arrow in FIG. 3A.

A busbar module 200 illustrated in FIGS. 3A and 3B is a preceding invention of the busbar module 20 (see FIGS. 4A to 4D) according to the present invention. In FIG. 3A, the busbar module 200 includes: a plurality of busbars 30 (12 busbars 30(1) to 30(12) in FIG. 3A) that are arranged in series; a flat cable 40 that is configured to include a plurality of linear conductors 40F (12 linear conductors 40F1 to 40F12 in FIG. 3A) that respectively transmit detected voltage signals of the busbars 30 to a controller and a resin portion 40J that covers all of the linear conductors 40F and both ends of the busbars 30 in a state where these linear conductors 40F are arranged in a planar shape; connection portions 80 that are configured to electrically connect a predetermined busbar 30 and a predetermined linear conductor 40F to each other; and a connector 90 that is configured to be fitted into an external mating connector in a state where the plurality of linear conductors 40F are collected.

<Flat Cable Having 12 Linear Conductors 40F1 to 40F12 Disposed on a Plane>

FIG. 3B is a cross-sectional view taken along the line B-B indicated by the arrow in FIG. 3A. The flat cable 40 is configured in such a manner that 12 linear conductors 40F (40F1 to 40F12) are disposed on a plane and are covered with the resin portion 40J. In the flat cable 40, furthermore, ends of the busbar 30 at the linear conductors 40F side are also covered with the resin portion 40J as a part of the flat cable 40. In this way, since the linear conductors 40F and the busbars 30 are integrally configured by the resin portion 40J, there are advantages that the busbar module 200 is easily manufactured and is convenient to handle. Opposite ends of the busbars 30 may be allowed to free ends, respectively, but there is a case where the opposite ends of the busbars 30 are collectively connected to each other by the resin portion 40J in the same way. In this case, the opposite ends of the busbars 30 are not fluttered, and are further improved in handling properties.

<Drawbacks of the Busbar Module 200>

As in the battery module disclosed in Japanese Patent Application Laid-open No. 2011-210710, the busbar module 200 have drawbacks that voltage detecting wires also increase as the battery cells are used much more to increase the output of the battery pack. In that case, the breadth (direction perpendicular to the longitudinal direction) of the flat cable becomes longer, and thus the dimension of the battery pack increases. For example, when the number of the battery cells is 12, 12 busbars are required on one side, the width of the flat cable becomes broaden (width L2 illustrated in FIG. 3B) in which 12 linear conductors 40F1 to 40F12 are arranged, and thus the size thereof becomes larger. In the battery pack, furthermore, when a temperature rises during use of the battery cells, a pitch between the electrode terminals may be shifted due to expansion or shrinkage of the battery cells in an arrangement direction. Although the case of several battery cells can be neglected, when the number of battery cells becomes greater, the pitch between the electrode terminals may be larger shifted, and thus there is a concern that the tolerance cannot be absorbed.

<Busbar Module 20 According to the Present Embodiment>

Figure 4A:
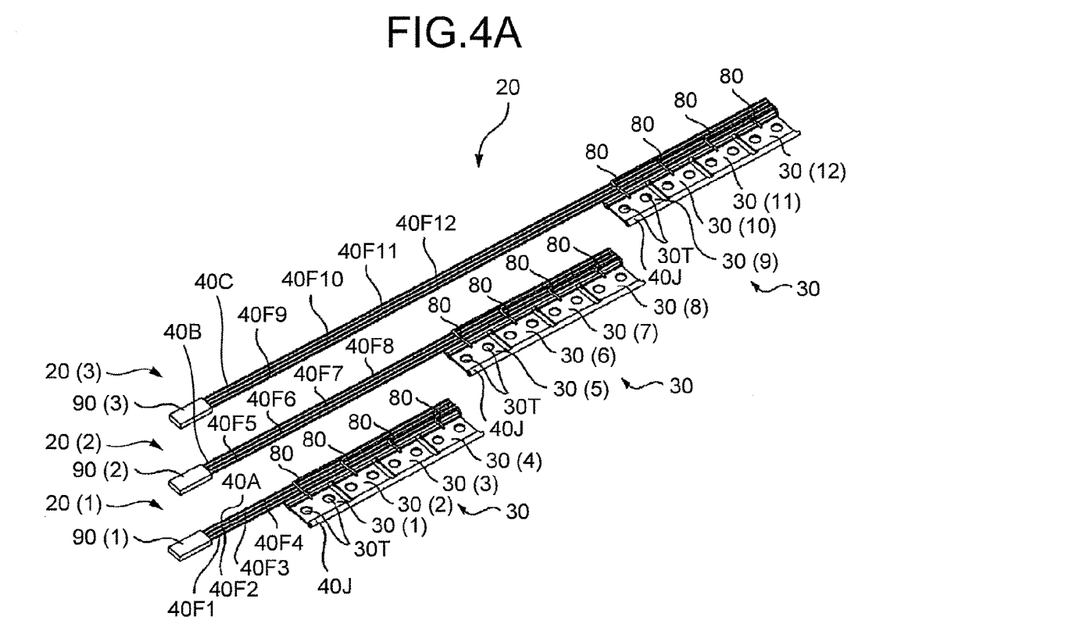
FIG. 4A is a perspective view of three split busbar modules including flat cables having different lengths, respectively.

The busbar module 20 of the present embodiment illustrated in FIG. 4A is configured to solve the above-described two drawbacks, that is, (1) increase in dimension of the battery pack and (2) occurrence of non-negligible tolerance. The busbar module 20 of the present embodiment is configured by a first split busbar module 20(1), a second split busbar module 20(2), and a third split busbar module 20(3) obtained in such a manner that the busbar module 200 illustrated in FIG. 3A is split three times in a longitudinal direction.

<First Split Busbar Module 20(1)>

The first split busbar module 20(1) of three split busbar modules {first to third split busbar modules 20(1), 20(2), and 20(3)} has a split flat cable 40A of a shortest length. Ends of first busbar groups 30(1) to 30(4) in the first split busbar module 20(1) are connected to the split flat cable 40A by a resin portion 40J that covers linear conductor groups (40F1 to 40F4) of the split flat cable 40A in the first split busbar module 20(1).

<Second Split Busbar Module 20(2)>

Figure 4B:
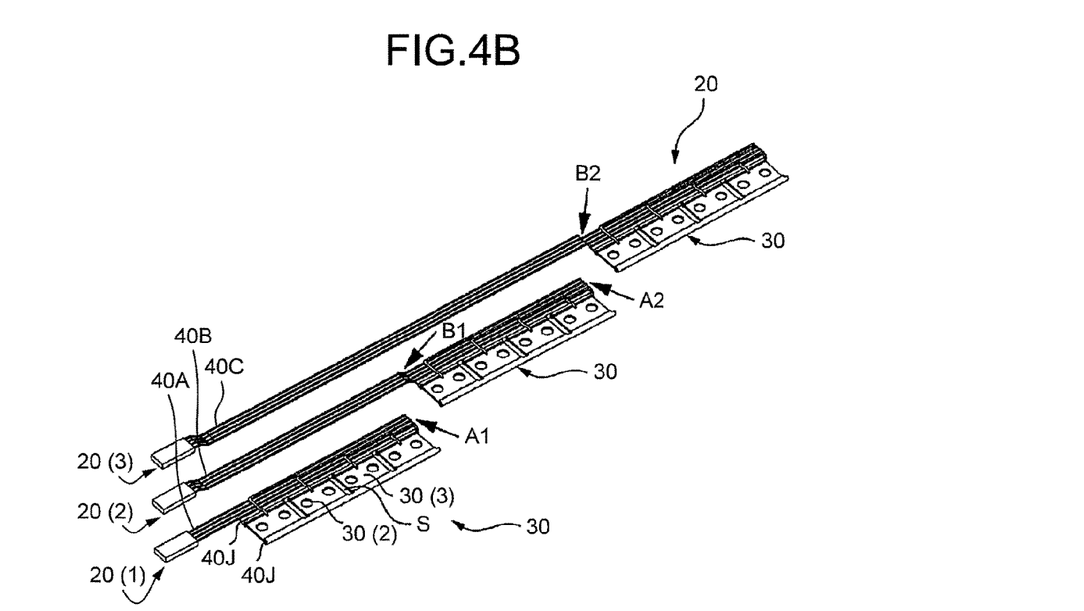
FIG. 4B is a perspective view illustrating a state where two of three split busbar modules illustrated in FIG. 4A are folded.

The second split busbar module 20(2) of the three split busbar modules has a split flat cable 40B of an intermediate length. In addition, ends of second busbar groups 30(5) to 30(8) in the second split busbar module 20(2) are connected to the split flat cable 40B by the resin portion 40J that covers linear conductor groups (40F5 to 40F8) of the split flat cable 40B in the second split busbar module 20(2). The split flat cable 40B becomes longer by a portion riding onto the first split busbar module 20(1) from the length of the split flat cable 40A of the first split busbar module 20(1). As illustrated in FIG. 4B, the split flat cable 40B is necessary to ride onto the split flat cable 40A of the first split busbar module 20(1) from a certain plane of the second busbar groups 30(5) to 30(8) at an end A1 of the split flat cable 40A of the first split busbar module 20(1). Therefore, the split flat cable 40B is bent at a riding position B1 as illustrated in FIG. 4B.

<Third Split Busbar Module 20(3)>

The third split busbar module 20(3) of the three split busbar modules has a split flat cable 40C of a longest length. Ends of third busbar groups 30(9) to 30(12) in the third split busbar module 20(3) are connected to the split flat cable 40C by the resin portion 40J that covers linear conductor groups (40F9 to 40F12) of the split flat cable 40C in the third split busbar module 20(3). The split flat cable 40C becomes longer by a portion riding onto the second split busbar module 20(2) from the length of the split flat cable 40B of the second split busbar module 20(2). The split flat cable 40C is necessary to ride onto the split flat cable 40B of the second split busbar module 20(2) from a certain plane of the third busbar groups 30(9) to 30(12) at an end A2 of the split flat cable 40B of the second split busbar module 20(2). Therefore, the split flat cable 40C is bent at a riding position B2 as illustrated in FIG. 4B.

<Placement Relation of Three Split Busbar Modules>

The busbar module 20 is obtained in such a manner that the split flat cable 40B of the second split busbar module 20(2) which is bent as illustrated in FIG. 4B is superposed on the split flat cable 40A of the first split busbar module 20(1) and the split flat cable 40C of the third split busbar module 20(3) is superimposed on the split flat cable 40B of the second split busbar module 20(2). That is, the flat cable 40 of the busbar module 20 is configured as a laminated body of the split flat cable 40A, the split flat cable 40B, and the split flat cable 40C.

<Downsizing of the Busbar Module 20 of the Present Embodiment>

Figure 4C:
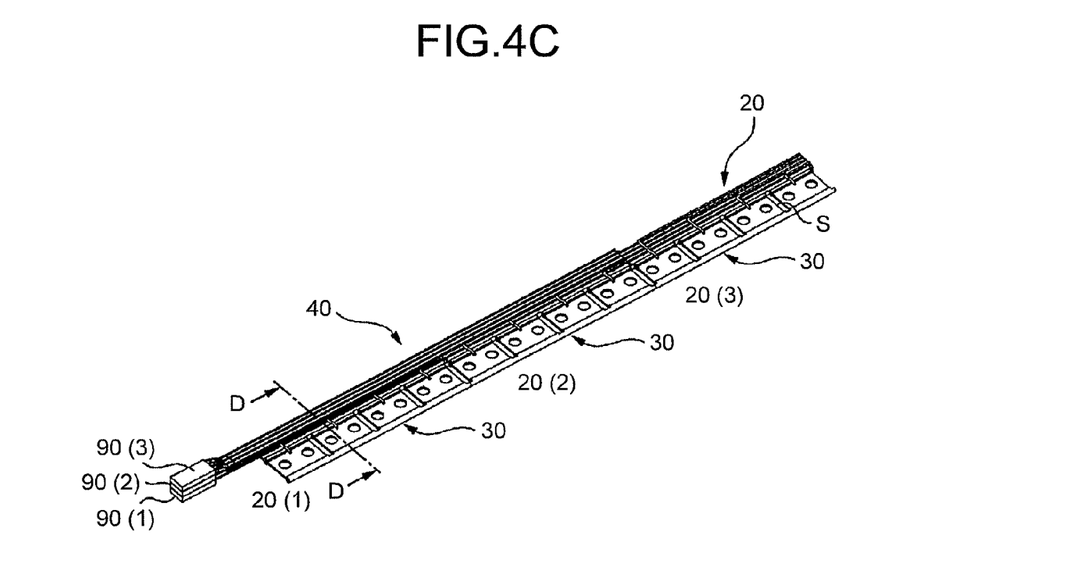
FIG. 4C is a perspective view of a busbar module according to the present invention.
Figure 4D:
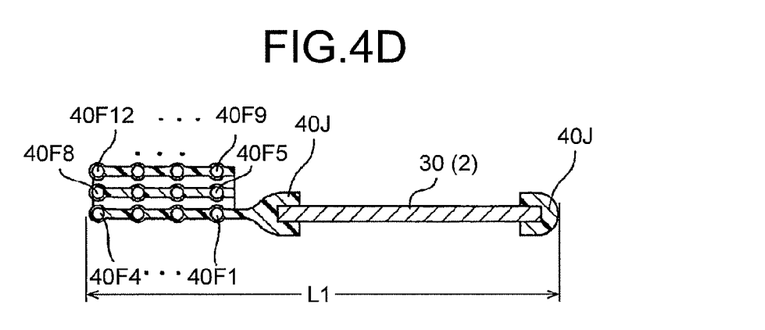
FIG. 4D is a cross-sectional view taken along the line D-D indicated by the arrow in FIG. 4C.

In the busbar module 20, as illustrated in FIG. 4D, the linear conductor groups 40F5 to 40F8 are superimposed on the linear conductor groups 40F1 to 40F4 which are fixed to each other with the resin portion 40J by which the first busbar groups 30(1) to 30(4) are connected to each other, and the linear conductor groups 40F9 to 40F12 are superimposed on the linear conductor groups 40F5 to 40F8. For this reason, a length L1 in a width direction of the busbar module 20 is largely downsized compared with a length L2 in a width direction of the conventional busbar module 200 (L1<L2).

<The Tolerance can be Neglected in the Busbar Module 20 of the Present Embodiment>

Furthermore, in the busbar module 20, even when the number of battery cells 60 increases and thus the tolerance of the pitch increases between the electrode terminals at both ends of the battery cell 60, since the number of battery cells 60 which are respectively fastened by the first split busbar module 20(1), the second split busbar module 20(2), and the third split busbar module 20(3) is few, the tolerance of the pitch becomes small enough to neglect between the electrode terminals at both ends of the battery cell 60 in the plurality of battery cells 60 connected to the first split busbar module 20(1), the second split busbar module 20(2), and the third split busbar module 20(3). In addition, if not negligible with even this tolerance, such a tolerance can be absorbed when the shape of a terminal through-hole 30T of the busbar 30 to be inserted into the electrode terminal is changed from a circular to an oval.

<Rectangular Through-Hole S of the Busbar Module 20>

The opposite ends of the busbars 30 connected to the split flat cables 40A, 40B, and 40C by the resin portion 40J may be allowed to free ends, but the opposite ends of the busbars 30 may be collectively connected to each other by the resin portion 40J in the same way. In this case, the opposite ends of the busbars 30 are not fluttered, and are further improved in handling properties. Furthermore, in this way, rectangular through-holes S are formed in areas surrounded by the adjacent busbars 30 and both ends of the resin portion 40J, as illustrated in FIG. 4B or 4C. For this reason, partition portions 70L and 70R of a separator 70 to be described below are inserted into the rectangular through-holes S, and thus the busbar module 20 is smoothly positioned during placement on the battery module 50.

<Battery Module 50 of the Present Embodiment>

Figure 5:
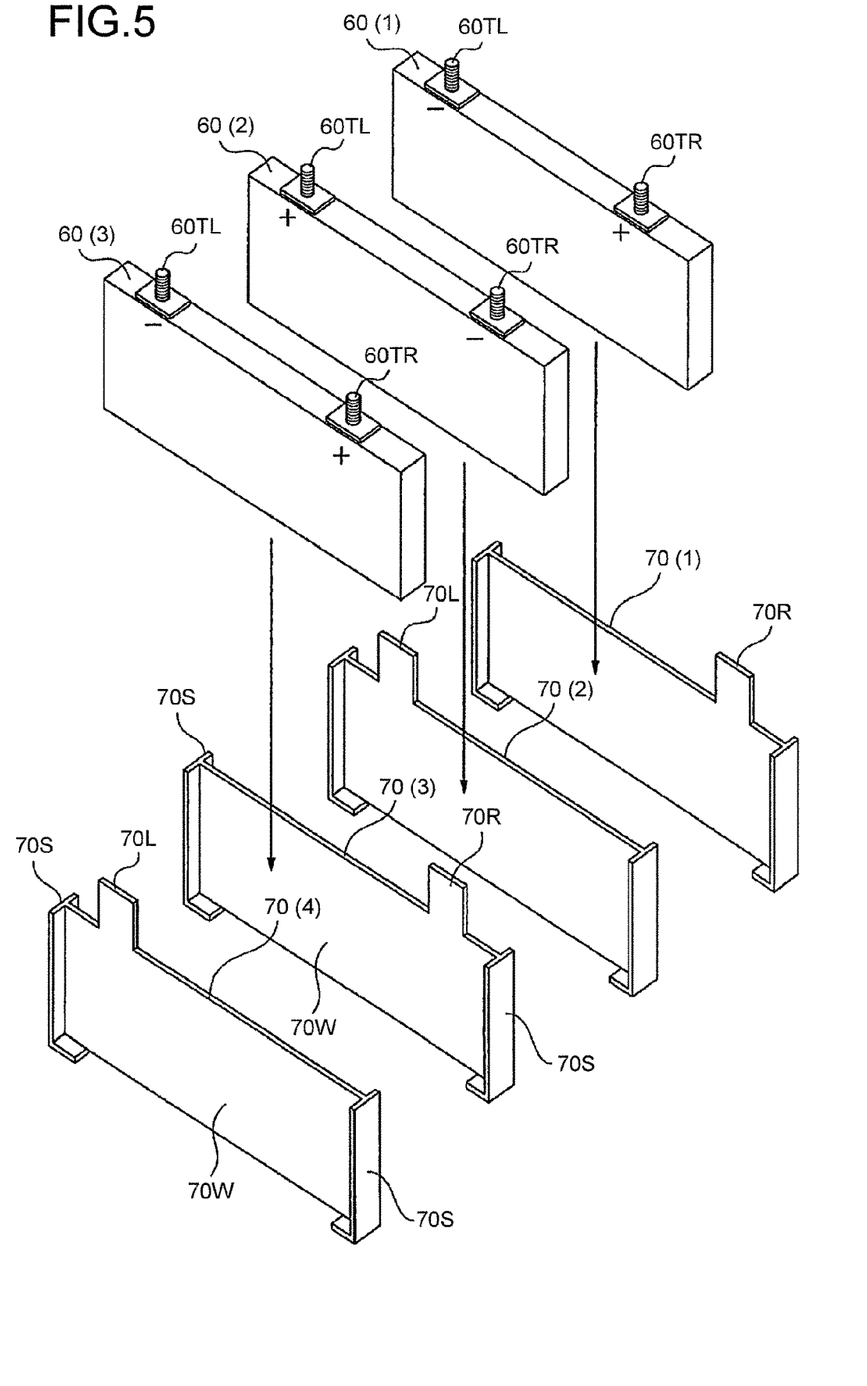
FIG. 5 is a partially exploded perspective view of the battery module.

The battery module 50 of the present embodiment is a device that is configured to generate a DC high-voltage and is formed in such a manner that the plurality of flat rectangular parallelepiped battery cells 60 are overlapped with each other through separators 70 as illustrated in FIG. 5. That is, the battery module 50 is disposed in the battery cells 60 are overlapped with each other such that the electrode terminals on one side of the plurality of battery cells 60 are arranged in a row and the electrode terminals on the other side thereof are arranged in a row.

<Shape of the Battery Cell 60>

All of the battery cells 60 have the flat rectangular parallelepiped shape and are provided with electrode terminals 60T and 60T (when distinguishing both of them, the left electrode terminal is indicated as 60TL and the right electrode terminal is indicated as 60TR in the drawings) in which bolts are erected near both upper ends of the battery cell 60. One of the electrode terminals 60T is a positive electrode (+), and the other thereof is a negative electrode (−).

<Placement Relation of the Plurality of Battery Cells 60>

For example, the battery module 50 is known in which positive electrode terminals and negative electrode terminals are alternately disposed in each row of the electrode terminals or are disposed in parallel to have the same electrode. In this example, the plurality of battery cells 60 are disposed such that each of the electrode terminals has a different polarity in the same row in the adjacent battery cells 60. For example, when an electrode terminal 60TL of a battery cell 60(1) illustrated in an upper-rightmost side of FIG. 5 is a negative electrode (−) and an electrode terminal 60TR of the battery cell 60(1) illustrated in the upper-rightmost side is a positive electrode (+), a battery cell 60(2) is juxtaposed adjacently to the battery cell 60(1) such that a left-side electrode terminal 60TL is a positive electrode and a right-side electrode terminal 60TR is a negative electrode in this drawing. In addition, a battery cell 60(3) is juxtaposed adjacently to the battery cell 60(2) such that a left-side electrode terminal 60TL is a negative electrode and a right-side electrode terminal 60TR is a positive electrode in this drawing. In view of this way, the following battery cells are juxtaposed.

<Series Connection of the Plurality of Battery Cells 60 with the Busbars 30>

When the electrode terminal 60TR (positive electrode) of the battery cell 60(1) is electrically connected to the electrode terminal 60TR (negative electrode) of the neighboring battery cell 60(2) by the busbar 30, two battery cell 60(1) and the battery cell 60(2) are connected to each other in series, and a DC voltage is obtained twice as much as a generating voltage of one battery cell 60(1) between the electrode terminal 60TL (negative electrode) of the battery cell 60(1) and the electrode terminal 60TL (positive electrode) of the neighboring battery cell 60(2). Similarly, when the electrode terminal 60TL (positive electrode) of the battery cell 60(2) is electrically connected to the electrode terminal 60TL (negative electrode) of the neighboring battery cell 60(3) by the busbar 30, the battery cell 60(2) and the battery cell 60(3) are connected to each other in series, and a DC voltage is obtained three times as much as the generating voltage of one battery cell 60(1) between the electrode terminal 60TR (negative electrode) of the battery cell 60(1) and the electrode terminal 60TR (positive electrode) of the battery cell 60(3). Hereinafter, in view of this way, when N battery cells 60 are connected to each other by the busbar 30, N-times DC high-voltage is obtained.

<Separator 70>

The separator 70 is a resin molded part which is devised to safely and orderly arrange the plurality of battery cells 60 with resource-saving.

<Shape of the Separator 70>

The separator 70 has a shape in which short axis portions of L-shaped side walls 70S and 70S are disposed opposite to each other and intermediate portions of both the side walls 70S and 70S are connected to each other to form a separator body 70W made of a rectangular thin plate. The side walls 70S and 70S have the breadth (width of L-shaped long axis portion) substantially equal to the thickness of the flat rectangular parallelepiped battery cell 60. The height of the side walls 70S and 70S and the height of the separator body 70W are substantially equal to the height of the battery cell 60. The breadth of the separator body 70W is substantially equal to the breadth of the battery cell 60.

<Accommodating the Battery Cell 60(1) in an Internal Space Formed by Two Separators 70>

Figure 6:
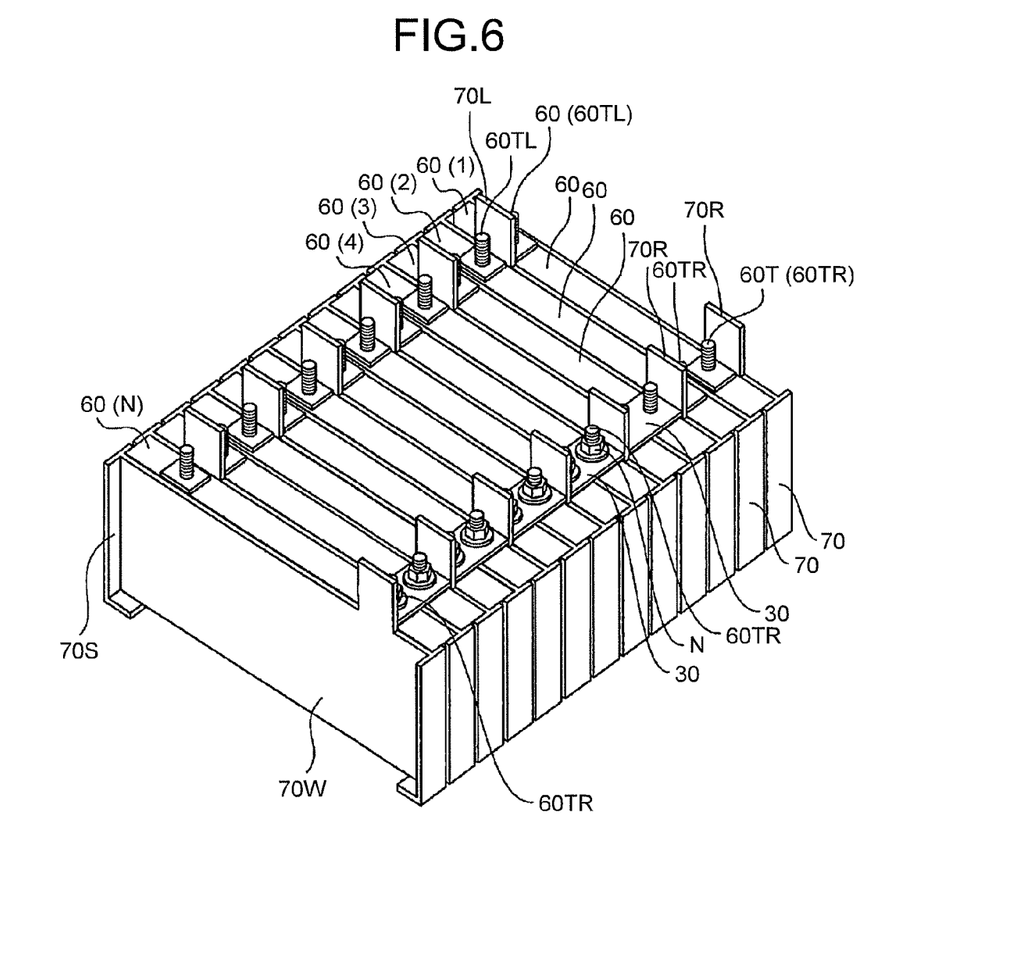
FIG. 6 is a perspective view of a battery module.

In FIG. 5, a rightmost separator 70(1) and a neighboring separator 70(2) are illustrated as separated from each other to easily show respective shapes, but are juxtaposed in contact with each other during practical use. Then, the battery cell 60(1) is accommodated in an elongated internal space formed between the separator 70(1) and the separator 70(2) which are juxtaposed with each other. Similarly, the battery cell 60(2) is accommodated in an elongated internal space between the separator 70(2) and a separator 70(3), and the battery cell 60(3) is accommodated in an elongated internal space between the separator 70(3) and a separator 70(4). Hereinafter, in view of this way, N battery cells 60 are accommodated in elongated internal spaces formed by the separators 70. FIG. 6 illustrates a state where the battery cells 60 are respectively accommodated in all of the internal spaces formed by the separators 70 in this way.

<The Partition Portion 70L or 70R is Present at an Upper Side of the Separator 70>

The partition portion 70L or the partition portion 70R is formed near either of right and left both ends of the upper side of the separator 70. In FIG. 5, the partition portion 70R is formed near a right end of the separator 70(1), the partition portion 70L is formed near a left end of the separator 70(2), the partition portion 70R is formed near a right end of the separator 70(3), and the partition portion 70L is formed near a left end of the separator 70(4).

<Two Functions of the Partition Portion 70L or 70R>

Here, the partition portion 70L is interposed between the electrode terminal 60TL (negative electrode) of the battery cell 60(1) and the electrode terminal 60TL (positive electrode) of the neighboring battery cell 60(2). That is, the partition portion 70L or 70R can suppress occurrence of a short circuit between the electrode terminals. In addition, the partition portion 70L or 70R is fixed to the rectangular through-hole S, and thus the busbar module 20 is smoothly positioned during placement on the battery module 50.

<Battery Module 50>

The electrode terminal 60TL on one side of the battery cell 60(1) forms one of positive and negative power supply terminals. The electrode terminal 60TL of the battery cell 60(2) adjacent to the battery cell 60(1) is electrically connected to the electrode terminal 60TL of the other battery cell 60(3) adjacent to the battery cell 60(2) by the busbar 30. FIG. 6 illustrates a state before the electrode terminal 60TL of the battery cell 60(2) is connected to the electrode terminal 60TL of the battery cell 60(3) by the busbar 30. In order to prevent a power supply short-circuit, the electrode terminal 60TL of the battery cell 60(1) and the electrode terminal 60TL of the battery cell 60(2) is partitioned by the partition portion 70L of the separator 70, and the electrode terminal 60TR of the battery cell 60(2) and the electrode terminal 60TR of the battery cell 60(3) are partitioned by the partition portion 70R of the separator 70. Hereinafter, by repetition in the same way, an electrode terminal 60TR of a leftmost (front) battery cell 60(N) in this drawing forms the other of the power supply terminals, all of the battery cells 60 are connected to each other between the electrode terminal 60TL of the battery cell 60(1) and the electrode terminal 60TL of the battery cell 60(N) in series, and thus a DC high-voltage is generated.

<Front of the Battery Module>

Figure 7:
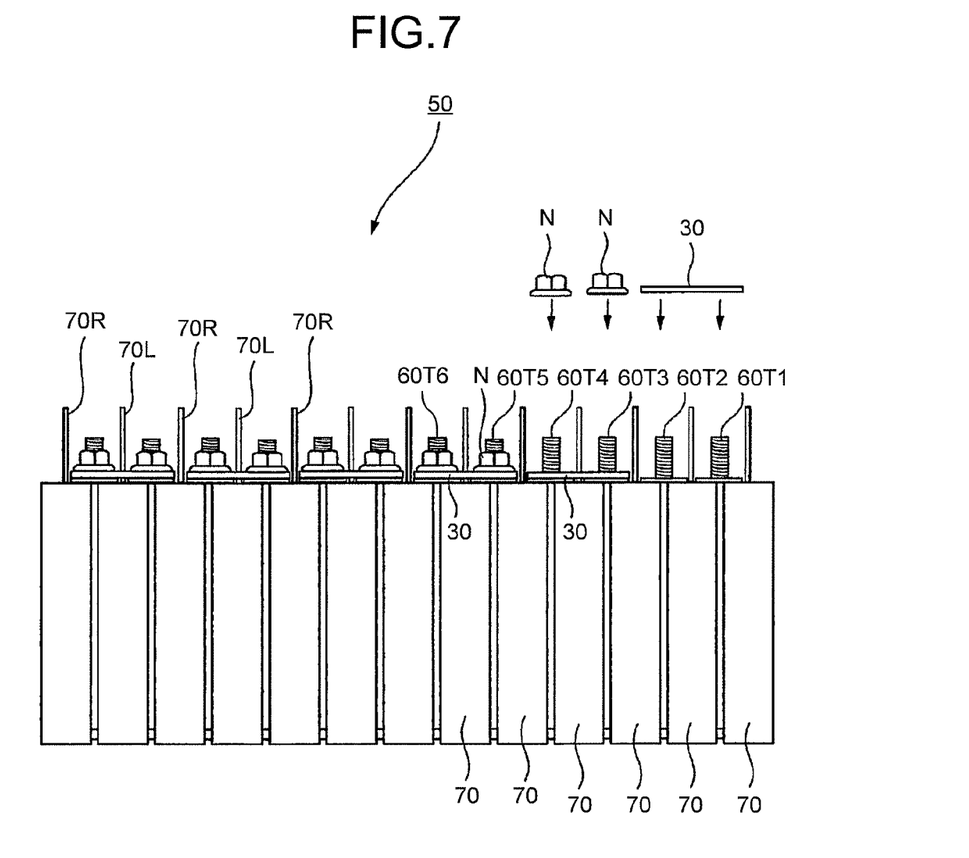
FIG. 7 is a front view of the battery module illustrated in FIG. 6.

FIG. 7 is a front view of the battery module 50 illustrated in FIG. 6. As illustrated in FIG. 7, when the busbar 30 is lowered from an upper side of an electrode terminal 60T1 erected above the battery cell 60(1) accommodated in a rightmost separator 70(1) and an electrode terminal 60T2 erected above the battery cell 60(2) adjacent to the battery cell 60(1) and thus the electrode terminals 60T1 and 60T2 are inserted into two terminal insertion holes 30T and 30T (see FIG. 4A) formed in the busbar 30, respectively, electrode terminals 60T3 and 60T4 are obtained as illustrated in FIG. 7. Next, when two nuts N and N are inserted and fastened into/with bolts of the electrode terminals 60T3 and 60T4, electrode terminals 60T5 and 60T6 are obtained as illustrated in FIG. 7. Thus, the adjacent electrode terminals are electrically connected to each other. Similarly, in FIG. 7, seventh and eighth electrode terminals 60T7 and 60T8 from the right are electrically connected to each other by the busbar 30, ninth and tenth electrode terminals 60T9 and 60T10 are electrically connected to each other by the busbar 30, and eleventh and twelfth electrode terminals 60T11 and 60T12 are electrically connected to each other by the busbar 30. In FIG. 7, it is understood that the partition portion 70L of the separator 70 is interposed between the other power supply terminals of each battery cell 60 provided with two power supply terminals connected to the busbar 30 to prevent the power supply short-circuit between the adjacent power supply terminals. It is understood that the partition portion 70R of the separator 70 is interposed between the adjacent the busbars 30 to prevent the power supply short-circuit between the adjacent power supply terminals.

<Connection Portion 80>

Returning to FIG. 4A, the connection portion 80 is a conductor that is configured to electrically connect the linear conductor 40F of the flat cable 40 to the busbar 30. Here, one terminal side of the connection portion 80 forms a press cutting edge that can perform press cutting on the linear conductor 40F of the flat cable 40, and the other terminal side is flatly formed so as to be welded or brazed.

<Connector 90>

Since the linear conductor groups are superposed in triplicate, three-layered connectors 90(1) to 90(3) are used as the connector 90.

<Applicable to Another Busbar Module as Well>

In the above embodiment, the description is made on the busbar module 20 in which the ends of the busbars 30 are connected to each other by the resin portion 40J that forms the flat cable 40, but such a busbar module 20 may not necessarily be used from the viewpoint of absorbing the tolerance of the pitch between the electrode terminals. As long as being configured using the flat cable, a busbar module may be used which is integrally configured with a conventional lamination.

<Other Modification Examples>

On the shortest split flat cable 40A of the first split busbar module 20(1), the longer split flat cable 40B of the second split busbar module 20(2) is disposed to be superposed in the above embodiment, but the present invention may be configured in a reverse manner without being limited thereto. That is, on the longest flat cable of the first split busbar module, the shorter flat cable of the second split busbar module is superposed, and the split busbar module having the shortest flat cable may be sequentially disposed on the uppermost side in the same manner.

SUMMARY

As described above, since the busbar module of the present embodiment is split into the plurality of split busbar modules having the busbar group and the split flat cable and the split flat cables of the split busbar modules are effectively disposed, respectively, such that the planes of the split flat cables are overlapped with each other, the breadth of the flat cable to be an assembly of the split flat cables is not changed even when the number of battery cells increases, and thus it is not necessary to increase the dimension of the battery pack (dimension in the direction perpendicular to the overlapped direction). In addition, the strong busbar module is obtained by the assembly of the split flat cables. Furthermore, according to the busbar module, since the number of battery cells to be mounted to each of the split busbar modules is small compared to the number of all battery cells of the battery pack, the split busbar modules can be mounted regardless of the tolerance of the pitch between the electrode terminals. In addition, according to the busbar module, even when the tolerance is increased, since the number of battery cells to be mounted to each of the split busbar modules is small, it is possible to absorb the tolerance by changing the shape of the terminal insertion hole, which is provided in the busbar, from a circular to an oval. Thus, the busbar module of the present embodiment can absorb the tolerance of the pitch between the electrode terminals without the need to increase the dimension of the battery pack even when the number of battery cells increases. Furthermore, the battery pack of the present embodiment uses such a busbar module and can absorb the tolerance of the pitch between the electrode terminals without the need to increase the dimension of the battery pack even when the number of battery cells increases. Here, according to the busbar module, the ends of the busbars are connected to each other by the resin portion that covers the split flat cables, and thus the manufacturing is simple, costs can be reduced, and handling becomes easier. Furthermore, according to the busbar module, since both edges of the plurality of busbars are connected to each other by the resin portion, a free end no longer exists in the busbars, the busbar module easy to handle is obtained. In addition, according to the busbar module, since the rectangular through-holes are formed between the busbars as a result, the partition portions of the separators are inserted into the rectangular through-holes, and thus the positioning between the battery module and the busbar module can be simplified. Furthermore, in the battery pack, the battery module includes the separators provided with the partition portions, and thus a safety battery module is obtained which can prevent the power supply short-circuit between the battery cells.

A busbar module according to the present invention can absorb the tolerance of pitches between electrode terminals without the need to increase the dimension of a battery pack even when the number of battery cells increases. In addition, a battery pack according to the present invention uses such a busbar module, whereby an increase in size is suppressed even when the number of battery cells increases.

Although the invention has been described with respect to specific embodiments for a complete and clear disclosure, the appended claims are not to be thus limited but are to be construed as embodying all modifications and alternative constructions that may occur to one skilled in the art that fairly fall within the basic teaching herein set forth.

What is claimed is:

1. A busbar module assembly comprising:
a plurality of split busbar modules, wherein each split busbar module among the plurality of split busbar modules includes a busbar group and a split flat cable with linear conductors electrically connected to the busbar group, such that the busbar module assembly includes a plurality of busbar groups and a plurality of split flat cables,
wherein each busbar group includes plural busbars, and the busbars are integrated with the linear conductors at one side of a longitudinal direction of the split flat cables,
wherein each busbar group connects to electrode terminals provided on at least two battery cells of a plurality of battery cells overlapped with each other in a same direction, and is configured such that the busbars are arranged in parallel at predetermined intervals in the same direction to electrically connect the electrode terminals arranged in the same direction to each other, the at least two battery cells being adjacent to each other in the same direction,
wherein the linear conductors are arranged in parallel at predetermined intervals along a row direction of the plurality of busbars,
wherein each split flat cable among the plurality of split flat cables includes a resin portion configured to cover the linear conductors,
wherein each split flat cable among the plurality of split flat cables has a length different from other split flat cables among the plurality of split flat cables, and
wherein at least one split flat cable of the plurality of split flat cables is stacked on another split flat cable throughout an entire length and with their widths aligned, and the busbar groups are arranged in a line along the longitudinal direction of the split flat cables.

2. The busbar module assembly according to claim 1, wherein
the plurality of split busbar modules are configured such that the plurality of split flat cables are overlapped with each other in descending order of a length or in ascending order of the length.

3. The busbar module assembly according to claim 2, wherein
each split busbar module is configured such that a corresponding busbar group and a corresponding split flat cable are connected to each other by the resin portion.

4. The busbar module assembly according to claim 2, wherein
edges of the busbars in each busbar group are connected to each other by another resin portion, the edges being opposite to a corresponding split flat cable.

5. A battery pack comprising:
the busbar module assembly according to claim 2; and
a battery module having the plurality of battery cells overlapped with each other in a same direction.

6. The busbar module assembly according to claim 1, wherein
each split busbar module is configured such that a corresponding busbar group and a corresponding split flat cable are connected to each other by the resin portion.

7. The busbar module assembly according to claim 6, wherein
edges of the busbars in each busbar group are connected to each other by another resin portion, the edges being opposite to a corresponding split flat cable.

8. A battery pack comprising:
the busbar module assembly according to claim 6; and
a battery module having the plurality of battery cells overlapped with each other in a same direction.

9. The busbar module assembly according to claim 1, wherein
edges of the busbars in each busbar group are connected to each other by another resin portion, the edges being opposite to a corresponding split flat cable.

10. A battery pack comprising:
the busbar module assembly according to claim 9; and
a battery module having the plurality of battery cells overlapped with each other in a same direction.

11. A battery pack comprising:
the busbar module assembly according to claim 1; and
a battery module having the plurality of battery cells overlapped with each other in a same direction.

12. The busbar module assembly according to claim 1, wherein at least one split flat cable comprises a bent riding position.

13. The busbar module assembly according to claim 1, wherein the plurality of split busbar modules comprises three split busbar modules.

14. A busbar module assembly comprising:
a plurality of split busbar modules, wherein each split busbar module among the plurality of split busbar modules includes a busbar group and a split flat cable with linear conductors electrically connected to the busbar group, such that the busbar module assembly includes a plurality of busbar groups and a plurality of split flat cables,
wherein each busbar group includes at least one busbar, and the at least one busbar is integrated with the linear conductors at one side of a longitudinal direction of the split flat cables,
wherein each busbar is configured to connect to an electrode terminal of a battery,
wherein the linear conductors are arranged in parallel at predetermined intervals along a longitudinal direction of each split flat cable of the plurality of split flat cables,
wherein each split flat cable of the plurality of split flat cables includes a resin portion arranged to cover the linear conductors,
wherein each split flat cable among the plurality of split flat cables has a length different from other split flat cables among the plurality of split flat cables,
wherein at least one split flat cable of the plurality of split flat cables is stacked on another split flat cable throughout an entire length and with their widths aligned, and the busbar groups are arranged in a line along the longitudinal direction of the split flat cables, and
each and every busbar and busbar group is arranged on a same side of the plurality of split flat cables that are stacked.

15. The busbar module assembly according to claim 14, wherein
the plurality of split busbar modules are stacked such that the plurality of split flat cables are overlapped with each other in descending order of a length or in ascending order of the length.

16. The busbar module assembly according to claim 14, wherein at least one split flat cable comprises a bent riding position.

17. The busbar module assembly according to claim 14, wherein the plurality of split busbar modules comprises three split busbar modules.

* * * * *